Aug. 2, 1927.

F. KÜHTZ

BAKING OVEN

Filed June 15, 1925   2 Sheets-Sheet 1

1,637,618

Inventor:
Friedrich Kühtz
by Kutchauts
atty.

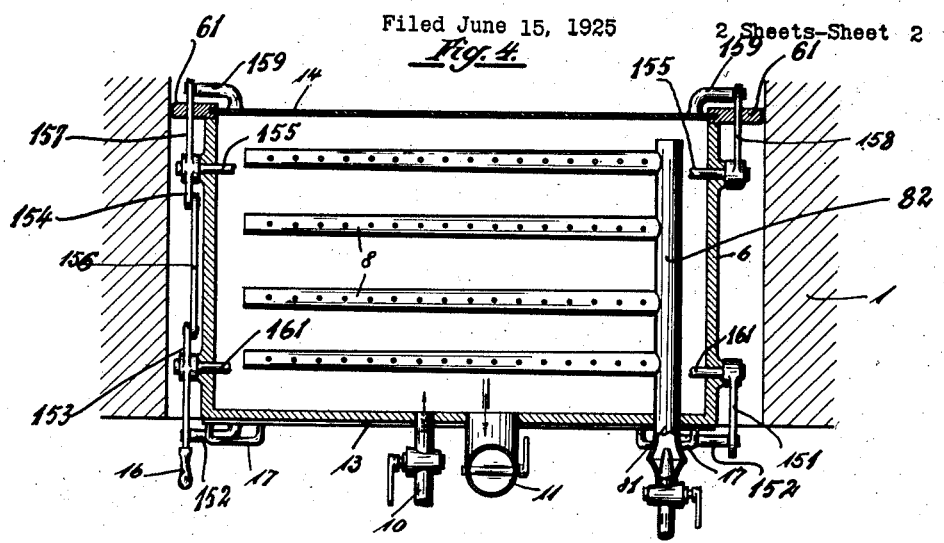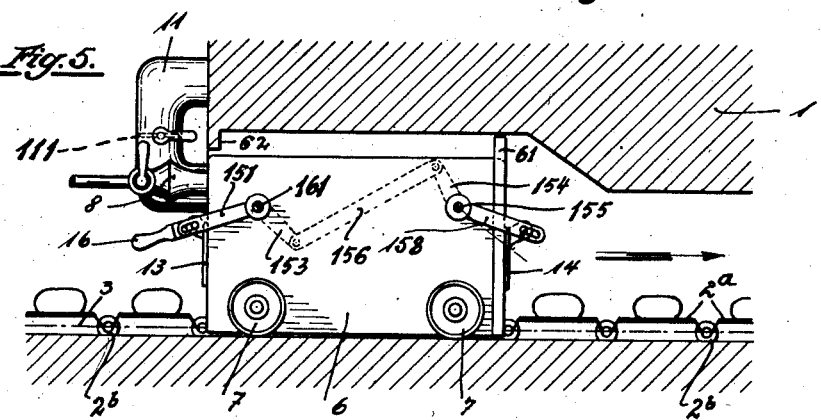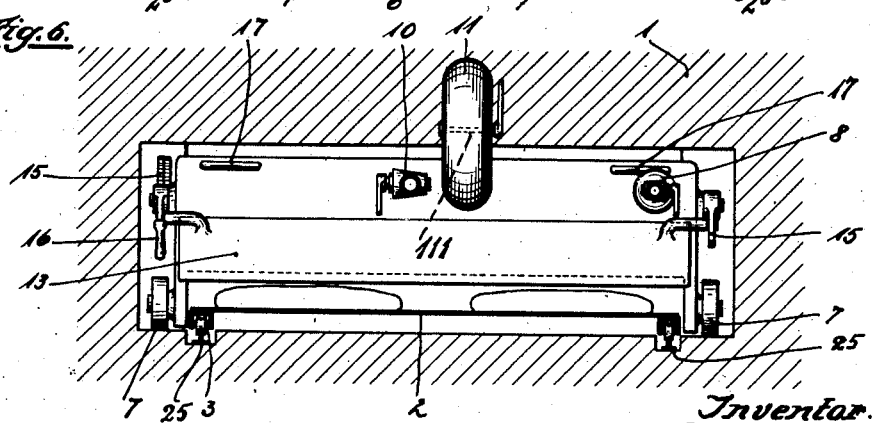

Patented Aug. 2, 1927.

1,637,618

UNITED STATES PATENT OFFICE.

FRIEDRICH KÜHTZ, OF CANNSTATT, GERMANY.

BAKING OVEN.

Application filed June 15, 1925, Serial No. 37,207, and in Germany June 17, 1924.

My invention relates to baking ovens, more especially to ovens for continuous operation. It is an object of my invention to remove the difficulties involved in the continuous operation of baking ovens in which the dough or the like is subjected to the action of steam for a short period and thereafter to dry heat. The solution of the problem is comparatively simple in ovens for intermittent operation. In ovens having intermittently operated conveyers and a steam chamber at the entrance end of the oven it is possible to steam the goods at the start, but in this case, it is necessary to supply with fresh loaves an area of the belt conveyer which is equal to the area in the steam chamber as many times as the steaming operation is repeated. In view of the considerable size of ovens of this kind this condition can be fulfilled only with rather complicated means, while for some kinds of goods it cannot be fulfilled at all, the more so, because the goods, after having been placed on the conveyer, are often cut and brushed over the water.

It has already been proposed to eliminate the necessity of arresting the belt conveyer during the steaming periods by conducting the conveyer belt in upwardly inclined direction in a closed steam chamber. By this expedient, however, the object sought is achieved but incompletely; as a rule the steaming period is too long and on the other hand the intensity of steaming is insufficient, as the chamber is only filled with a thin veil of steam while in reality, and more particularly in the case of rye bread, a dense cloud of steam under pressure is required in order to keep the crust soft and shiny notwithstanding the high initial heat.

On the other hand, continuous operation of the conveyer is very desirable and, in many cases, indispensable, because it is then possible to continuously put on, cut and brush the loaves.

According to the present invention the problem of effecting a short and intense steaming in a continuously operated oven is solved by providing a movable steam chamber having the form of a hood or chest covering the predetermined area of the conveyer belt and which travels with the belt a certain distance which may be equal to the length or part of the length of the hood, whereupon the hood is rapidly returned to its initial position so as to cover a number of fresh loaves. The hood is filled with dense steam after having been placed over the loaves. If the heat from below does not suffice, the hood may be provided with separate heating means. The steam can be expelled from the hood at any desired moment, before the hood starts on its return stroke.

In the drawings affixed to specification and forming part thereof, an oven embodying my invention is illustrated diagrammatically by way of example.

In the drawings Fig. 1 is a longitudinal section of the oven,

Figs. 3 and 4 are cross sections,

Fig. 5 is a side elevation, and

Fig. 6 is a rear end elevation of the steam hood.

Figure 1:
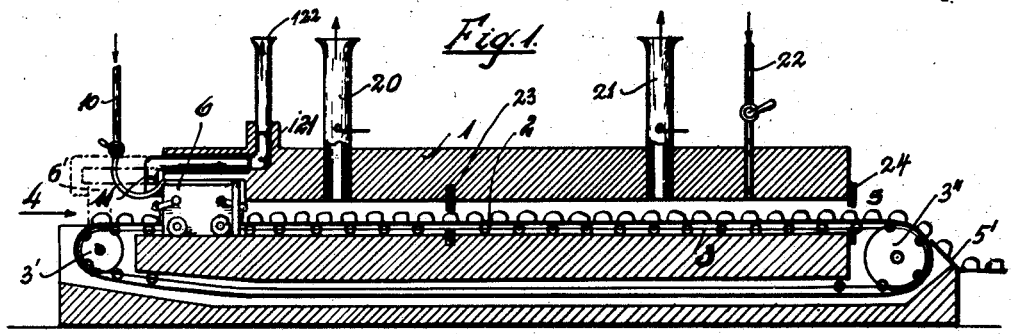

Referring to the drawings, 1 is the brickwork of the oven in which a tunnel is formed for the belt conveyer 2 which runs over sheaves 3' 3" arranged at the fore and aft ends of the oven.

The loaves are placed on the belt 2 and enter the oven in the direction of the arrow 4. The finished goods leave the oven at 5 and are discharged from the belt 2 on an inclined chute 5'. At the front end of the oven the travelling hood or chest 6 is arranged. It can be moved into the initial position indicated in dotted lines at 6'. The oven is provided with the usual discharge pipes 20 and 21, steam pipe 22, partition 23 and end door 24.

Figure 2:
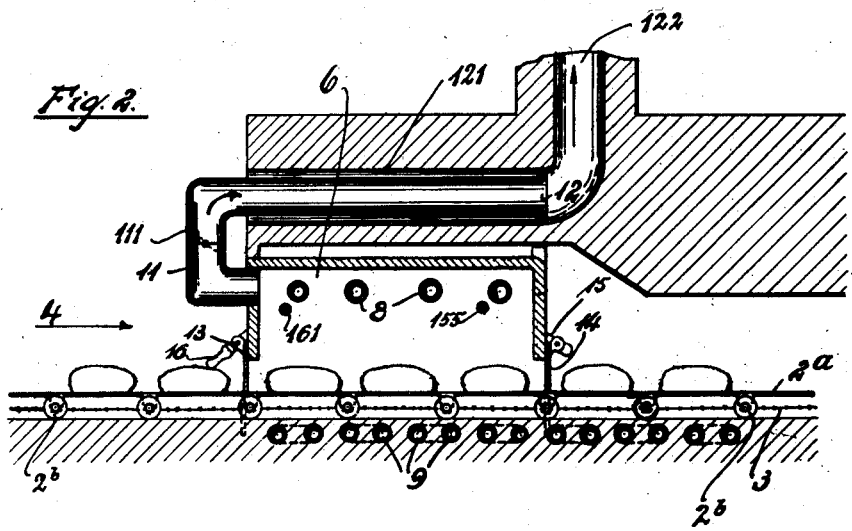
Fig. 2 is a similar view of its front end, drawn to a larger scale.
Figure 3:
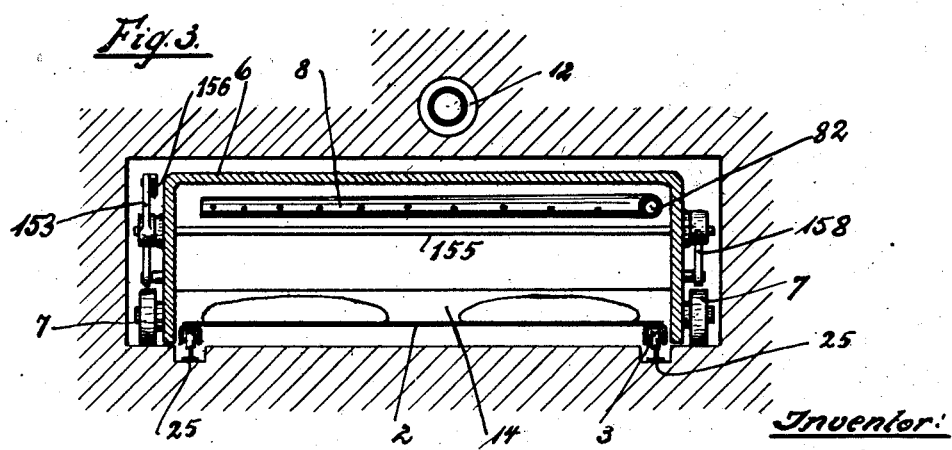

In Figs. 2, 3 and 6 the belt conveyer is shown to comprise a number of laths $2^a$ each provided at either end with rollers $2^b$ which move on a track 25 and are connected by chains 3.

The hood 6 has four wheels 7 with which it rests on the sole of the tunnel. 8 are preferred gas pipes to which a mixture of gas and air from a Bunsen burner 81 is supplied through a header 82. A rubber tube or some other flexible connection (not shown) may be provided to supply gas to the burner 81. Obviously other heating means for instance electric may be provided. Steam is supplied to the interior of the hood through a pipe 10 in which a rubber tube or some other flexible connection may be inserted as shown in Fig. 1. Heating pipes 9 may be embedded in the sole of the tunnel for heating the loaves from below. 11 is a pipe equipped with a throttle 111 for discharging steam or vapours from the hood 6, this pipe being bent into U-shape and provided at its free end with a flange 12 which moves in a passage 121 ending in a chimney 122.

Slides 13 and 14 mounted at the front and rear walls of the hood 6 are governed by a system of links and levers 15 provided with an operating handle 16 at the rear end of the hood, which is fixed to a shaft 161 extending transversely across the hood. At the opposite end of the shaft a lever 151 is secured. The handle 16 and lever 151 engage pins 152 of the front slide 13. A lever 153 mounted on the same end of shaft 161 as lever 16 and preferably integral with the shaft is connected with another lever 154 on a shaft 155 at the other end of the hood by a connecting rod 156. Levers 157 and 158 mounted on both ends of the shaft 155 outside the hood 6 are connected with pins 159 of the slide 14 so that by raising the handle 16 the slides 13 and 14 are raised, while by lowering it they are lowered also. A transverse flange 61 is secured to the rear end of the hood, and a check 62 is provided at the front end of the oven tunnel for limiting the stroke of the hood.

Instead of the slides 13, 14 other suitable means may be provided, such as for instance hinged flaps so dimensioned as to pass clear of the loaves when being opened. The hood may also be arranged to be raised and lowered, so that it can be returned to its initial position at the front end of the oven and lowered on the conveyer. Means for raising and lowering the hood may be combined with flaps or doors at its ends so that the hood may be slightly raised in order to facilitate the operation of the flaps or slides.

I may also provide automatic means (not shown) for performing all or any of the operations connected with the hood. Grips 17 are provided on the front wall of the hood 6. In operation loaves or other goods are placed on the conveyer 2 at the front end of the oven as indicated by the arrow 4, and the hood 6 is moved into its initial position shown in dotted lines at 6' in Fig. 1, in which it covers the fresh loaves. The slides 13 and 14 and the throttle 111 are closed, and steam is admitted to the pipe 10. The hood is now carried along by the conveyer 2 by friction, the slides 13 and 14 resting on the conveyer. After a predetermined time, the steam supply pipe 10 is closed and the throttle 111 of the discharge pipe 11 is opened, so that the steam and vapour can escape from the hood into the chimney 122. The opening of the discharge pipe 11 and the closing of the steam pipe 10 are timed in conformity with the character of the dough. When the hood has reached the position shown in full lines (Figs. 1, 3, 4, and 5) with its front wall substantially flush with the front end of the oven, the slides 13 and 14 are raised by means of the handle 16, and the hood is returned to its initial position by means of the grips 17. The outward stroke of the hood is limited by the flange 61 meeting the check 62.

I wish it to be understood that I do not desire to be limited to the exact details of construction, shown and described, for obvious modifications will occur to a person skilled in the art.

I claim:

1. A baking oven comprising a substantially horizontal conveyer movable in said oven, a movable hood extending over said conveyer located at the entrance of said oven and arranged to be coupled with and to travel a limited distance with said conveyer, and steam supplying means connected with said hood.

2. A baking oven comprising a substantially horizontal conveyer movable in said oven, and a movable hood extending over said conveyer located at the entrance of said oven and arranged to be coupled with and to travel a limited distance with said conveyer, the end walls of said hood being formed with openings, means for controlling said openings, and steam supplying means connected with said hood.

3. A baking oven comprising a substantially horizontal conveyer movable in said oven, a movable hood extending over said conveyer located at the entrance of said oven and arranged to be coupled with and to travel a limited distance with said conveyer, the end walls of said hood, being formed with openings, slides adapted to control said openings, means for operating said slides in unison, and steam supplying means connected with said hood.

4. A baking oven comprising a substantially horizontal conveyer movable in said oven, a movable hood extending over said conveyer located at the entrance of said oven and arranged to be coupled with and to travel a limited distance with said conveyer, steam supplying means connected with said hood, and means for heating said hood.

5. A baking oven comprising a substantially horizontal conveyer movable in said oven, a movable hood extending over said conveyer located at the entrance of said oven and arranged to be coupled with and to travel a limited distance with said conveyer, steam supplying means connected with said hood, means for moving said hood relatively to said conveyer, a flange on said hood, and a check on said oven for limiting the motion of said hood.

6. A baking oven comprising a substantially horizontal conveyer movable in said oven, a movable hood extending over said conveyer located at the entrance of said oven and arranged to be coupled with and to travel a limited distance with said conveyer, steam supplying means connected with said hood, and steam exhausting means on said hood extending into and reciprocable in a flue provided in said oven.

In testimony whereof I affix my signature.

FRIEDRICH KÜHTZ.